(12) United States Patent  (10) Patent No.: US 7,991,756 B2
Jacopi et al.  (45) Date of Patent: Aug. 2, 2011

(54) ADDING LOW-LATENCY UPDATEABLE METADATA TO A TEXT INDEX

(75) Inventors: Tom William Jacopi, San Jose, CA (US); Andreas Neumann, Gilroy, CA (US); Liem Gioi Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/190,118

(22) Filed: Aug. 12, 2008

(65) Prior Publication Data

US 2010/0042599 A1  Feb. 18, 2010

(51) Int. Cl.
G06F 17/30 (2006.01)
(52) U.S. Cl. .................................. 707/706; 707/741
(58) Field of Classification Search .................. 707/696, 707/706, 707, 711, 715, 741, 764
See application file for complete search history.

(56) References Cited

U.S. PATENT DOCUMENTS

| | | | |
|---|---|---|---|
| 6,353,823 B1 | 3/2002 | Kumar | |
| 6,981,002 B2* | 12/2005 | Nunez | 707/706 |
| 7,328,303 B1* | 2/2008 | Waterhouse et al. | 711/112 |
| 7,447,713 B1* | 11/2008 | Berkheimer | 1/1 |
| 2002/0156756 A1* | 10/2002 | Stanley et al. | 706/47 |
| 2003/0074352 A1 | 4/2003 | Raboczi et al. | |
| 2005/0278378 A1* | 12/2005 | Frank | 707/104.1 |
| 2006/0155739 A1* | 7/2006 | Broder et al. | 707/102 |
| 2007/0106509 A1* | 5/2007 | Acero et al. | 704/240 |
| 2007/0112809 A1 | 5/2007 | Arrouye et al. | |
| 2007/0143559 A1 | 6/2007 | Yagawa et al. | |
| 2007/0203938 A1 | 8/2007 | Prahlad et al. | |
| 2007/0250532 A1 | 10/2007 | Beato et al. | |
| 2007/0260592 A1 | 11/2007 | Anglin et al. | |
| 2007/0299828 A1* | 12/2007 | Lewis et al. | 707/3 |

* cited by examiner

*Primary Examiner* — Cam-Linh Nguyen
(74) *Attorney, Agent, or Firm* — Patterson & Sheridan, LLP (57) ABSTRACT

Techniques are disclosed for allowing efficient updating of metadata and high performance searching through the use of a text index and a separate updateable metadata index. Generally, an updateable metadata index is used to store document metadata. A text index is used to store document text. Documents in the text index are stored in the same order as the corresponding metadata entries. Upon receiving a search query, a search engine decomposes the query into a metadata condition and a text condition. Search engine performs a parallel scan upon the metadata index and the text index. To increase performance, metadata entries are skipped over if the corresponding text entries do not match the text condition. During the scan, when a document in the metadata index matches a document in the text index, the document is stored in the search results. After the scan, search results are displayed.

24 Claims, 5 Drawing Sheets

FIG. 5 ial tool
ADDING LOW-LATENCY UPDATEABLE METADATA TO A TEXT INDEX

BACKGROUND OF THE INVENTION

1. Field of the Invention

Embodiments of the present invention relate to updating a search index and searching for documents.

2. Description of the Related Art

Document retrieval systems have become an essential tool for organizing and gathering information on computer systems. For example, companies may store emails, word documents, pdf files, etc. on a computer system so they may be retrieved at a later time. Because of the large number of documents that accumulate over time, a search engine may be used to locate documents. A search engine is a computer program that accepts search queries from a user and retrieves documents that meet the query conditions. For example, a user may wish to retrieve all company emails that contain the words "October shipment" in order to learn more about a particular shipment. Furthermore, metadata may be associated with documents to provide additional useful information. For example, a "link" field may be associated with each email to indicate whether the email contains any links to websites. Thus, the user may search for emails that contain the words "October shipment" and that also contain links to websites.

When the number of documents in an information retrieval system becomes large, the search engine may take a very long time to scan every word in a document corpus. Thus, it may take a long time to retrieve documents that match the user's query. However, search indexes may be used to allow fast and accurate information retrieval. Indexing refers to a process where text from documents is parsed and stored in a search index. The data may include both metadata and document text. For example, one entry in a search index may store the word, "shipment." Another field may store a list of which documents contain the word, "shipment" (for example, "document 1, document 3, document 5"). Another field may store metadata, such as the date that a document was created or a storage location in a file system where the document may be found.

When a document's metadata or content changes, the document is typically reindexed. Reindexing involves updating a search index to reflect new content. Documents are often reindexed due to a change in metadata. For example, document metadata in a search index may provide a folder name indicating where the document is located. When the document is moved to a different folder, the document is reindexed so that the metadata provides the correct folder name. Therefore, search results remain accurate and up to date.

SUMMARY OF THE INVENTION

One embodiment of the invention includes a method for scanning a text index and a metadata index, in parallel, to identify entries that satisfy both a metadata condition and a text condition included in a search query. The method may generally include, in response to receiving the query, iteratively scanning the text index and the metadata index. The scanning may generally include advancing a current position in both the text index and the metadata index to a respective next entry in the text index and the metadata index which references a respective document that satisfies the respective text condition and metadata condition. Upon determining that the current position in the text index and the current position in the metadata index each advanced to a position referencing the same document, that document is added to a set of query results for the query. Otherwise, upon determining that the respective current positions in the text index and the metadata index are different relative to one another, the current position of one of the text index and the metadata indexes is advanced to the current position of the other index.

Another embodiment of the invention includes a computer readable storage medium containing a program which, when executed, performs an operation for scanning a text index and a metadata index, in parallel, to identify entries that satisfy both a metadata condition and a text condition included in a query. The operation may generally include, in response to receiving the query, iteratively scanning the text index and the metadata index. The scanning may generally include advancing a current position in both the text index and the metadata index to a respective next entry in the text index and the metadata index which references a respective document that satisfies the respective text condition and metadata condition. Upon determining that the current position in the text index and the current position in the metadata index each advanced to a position referencing the same document, that document is added to a set of query results for the query. Otherwise, upon determining that the respective current positions in the text index and the metadata index are different relative to one another, the current position of one of the text index and the metadata indexes is advanced to the current position of the other index.

Still another embodiment of the invention includes a system having a processor and a memory containing a program, which, when executed by the processor is configured to perform an operation for scanning a text index and a metadata index, in parallel, to identify entries that satisfy both a metadata condition and a text condition included in a query. The operation of the program may generally include, in response to receiving the query, iteratively scanning the text index and the metadata index. The scanning may generally include advancing a current position in both the text index and the metadata index to a respective next entry in the text index and the metadata index which references a respective document that satisfies the respective text condition and metadata condition. Upon determining that the current position in the text index and the current position in the metadata index each advanced to a position referencing the same document, that document is added to a set of query results for the query. Otherwise, upon determining that the respective current positions in the text index and the metadata index are different relative to one another, the current position of one of the text index and the metadata indexes is advanced to the current position of the other index.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Document retrieval systems often use a search index in order to allow fast and accurate information retrieval. A search engine may search the metadata and text in a search index in order to determine which documents match a query, without actually parsing the text of each individual document. When the text or metadata for a document changes, the document must be reindexed. Reindexing is the process of re-analyzing a document and updating the search index with new metadata and text. Doing this within the text index requires the entire document to be reindexed, which may take a long time. Updating multiple documents only exacerbates the problem.

For example, a company may store text documents (emails, word documents, etc.) in different folders on a computer file system. A search index may store both metadata and an indication of what text is present in a given document. Metadata may include, e.g., a folder on disk which the document is stored. For example, some documents may be stored in folder A while others are stored in folder B. If the contents of a document are changed, then the document may need to be reindexed so that the search index accurately reflects the modified content. Furthermore, the document may also need to be reindexed if it is moved from folder A to folder B. Reindexing may take a significant amount of time because the document must be analyzed and the search index must be modified. Therefore, if the document has recently been moved from folder A to folder B, search results may be inaccurate because the results may show that the document still resides in folder A. Moreover, folder locations and other document metadata may often change, further reducing the reliability of search query results. Note however, if only document metadata is updated, then information in the index regarding document content remains accurate. Nevertheless, if the index stores data reflecting both content and metadata, then the information may be cut from the index and effectively recreated when the document with the new metadata is reindexed.

Embodiments of the invention use a text index and a separate updateable metadata index, which allows efficient updating of metadata and high performance searching. Generally, an updateable metadata index is used to store document metadata. Importantly, the metadata index references documents in sequence, in particular, the order in which a given document is added to the metadata index. Further, updating the metadata should not change the sequence ID assigned to a given document. At the same time, a separate text index is used to indicate what words or terms are present within the text of a given document. Like the metadata index, the text index includes a list of entries, one per document, and a sequence ID assigned to an entry in the text index does not change if the document is modified and reindexed.

Upon receiving a search query, a search engine may decompose the query into a metadata condition and a text condition. The search engine evaluates the metadata condition against the metadata index to determine what entries satisfy the metadata condition. Similarly, the search engine evaluates the text condition to identify what entries of the text index satisfy the text condition. In one embodiment, the search engine may then perform a parallel scan against the entries that satisfied the individual metadata condition and the text condition. To increase performance, the parallel scan is started on each index, scanning in the same order. Whenever a match is produced in one of the indexes, the scan on the other is advanced to the corresponding entry. That is, when one of the scans advances ahead of the other, the slower progressing scan is "bumped" ahead to the faster progressing one. Doing so allows the scanning process to be completed in the same time as the faster of either the scan of the text index or the metadata index. Processing in this way also means the scan never has to go backwards and can complete in one pass. During the scan, when a document is identified that matches both the metadata condition and the text condition, that document is stored in the search results. After the scan, search results may be returned to user application, e.g., for display.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
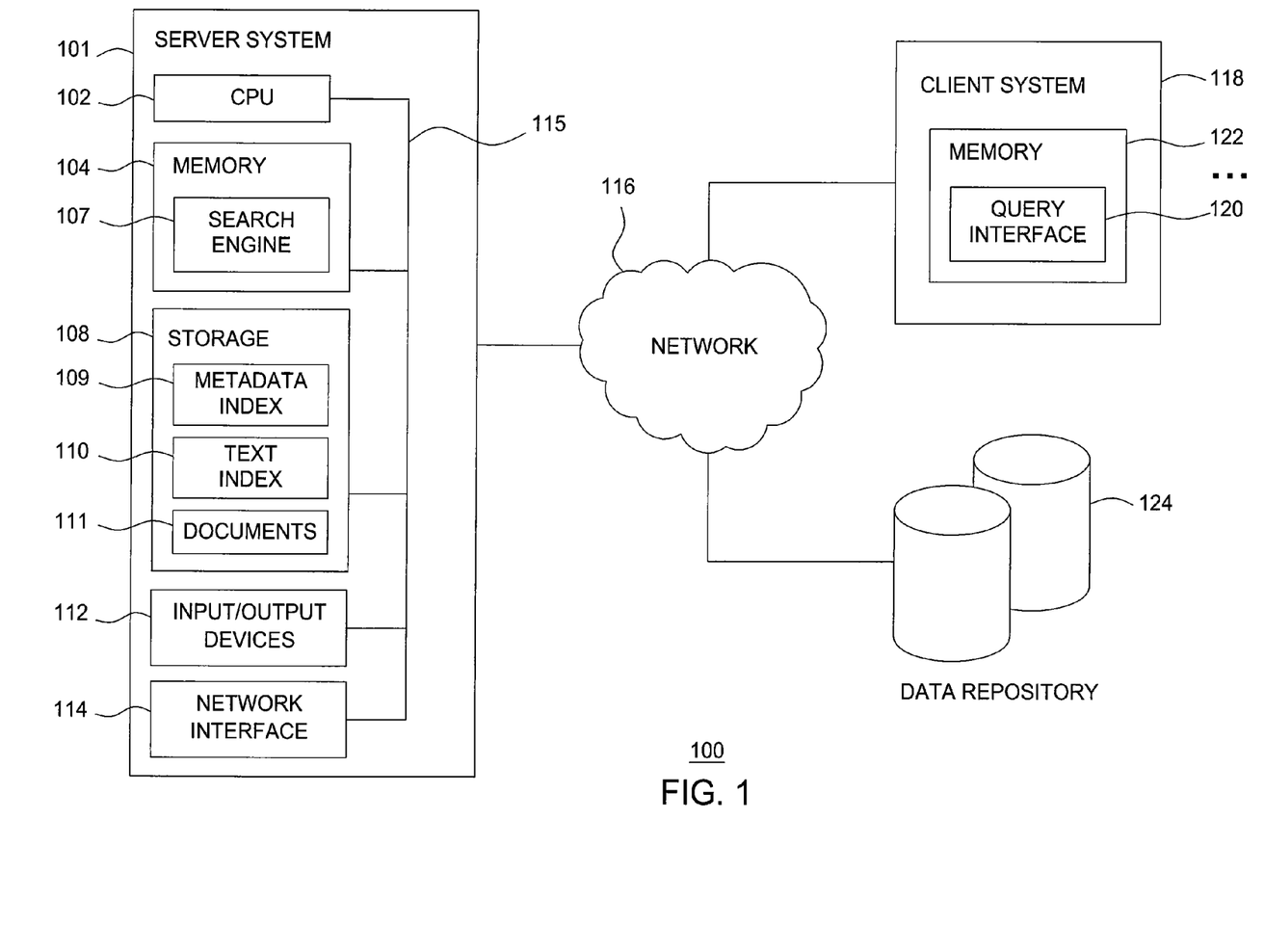
FIG. 1 is a block diagram illustrating a computing environment that includes a search engine, a metadata index, a text index, and documents, according to one embodiment of the invention.

FIG. 1 is a block diagram illustrating a computing environment 100 with a server system 101 that includes a search engine 107, a metadata index 109, a text index 110, and documents 111, according to one embodiment of the invention. The server system 101 is included to be representative of existing computer systems, e.g., desktop computers, server computers, laptop computers, tablet computers, and the like. However, the server system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking nonvolatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, server system 101 includes a central processing unit (CPU) 102, which obtains instructions and data via a bus 115 from memory 104 and storage 108. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 108 stores application programs and data for use by server system 101. Storage 108 may be hard-disk drives, flash memory devices, optical media and the like. Server system 101 may be connected to a data communications network 116 (e.g., a local area network, which itself may be connected to other networks such as the internet).

As shown, storage 108 includes metadata index 109, text index 110, and documents 111. Documents 111 represent a collection of documents that may be searched using search queries. Such a collection of documents 111 is commonly referred to as a "corpus." Documents 111 may include any type of stored information, such as web pages, text/pdf files, emails, web pages, etc. Text index 110 stores an index of what content is included in a given document 111. That is, the text index 110 may be used to determine whether a document (or what documents) contain a given word much more efficiently than evaluating the complete document (or documents) directly. For example, text index 110 may store a list of first names and last names that appear in each document. Metadata index 109 may store a set of metadata related to each document 111. For example, metadata index 109 may store the name of the folder that each document is located, e.g., a pathname in a file system. One of ordinary skill in the art will recognize that documents 111, text index 110 and metadata index 109 may be stored at another location that is accessed through network 116, such as data repository 124. Additionally, server system 101 includes input/output devices 112 such as a mouse, keyboard and monitor, as well as a network interface 114 used to connect server system 101 to network 116.

Memory 104 can be one or a combination of memory devices, including random access memory, nonvolatile or backup memory, (e.g., programmable or flash memories, read-only memories, etc.). As shown, memory 104 includes search engine 107. Search engine 107 scans metadata index 109 and text index 110 to determine which documents meet a query's conditions. For example, if a user enters "folder=A and name=Jack" as the query conditions, then search engine 107 finds documents in Folder A that contain "Jack." Note, in this example query, a first condition is directed to the contents of the document (name=Jack) while a second condition is directed to a property of the document (folder=A). That is, the second condition is directed to document metadata.

Client computer system 118 may include be configured with the same types of components as server system 101, e.g., a CPU, a memory, 122, and storage. Additionally, as shown, memory 122 includes query interface 120, which may allow a user to enter a search query. Search engine 107 may receive the query. Search engine 107 which responds by retrieving a set of documents 111 that match the query conditions. In one embodiment, query interface 120 is a web browser. Of course, input/output devices 112 on server system 101 may also be used to enter queries and receive results. Furthermore, client system 118 may be an individual's desktop personal computer or any other computer system connected to network 116 such as a mobile device, PDA, laptop, etc.

Figure 2:
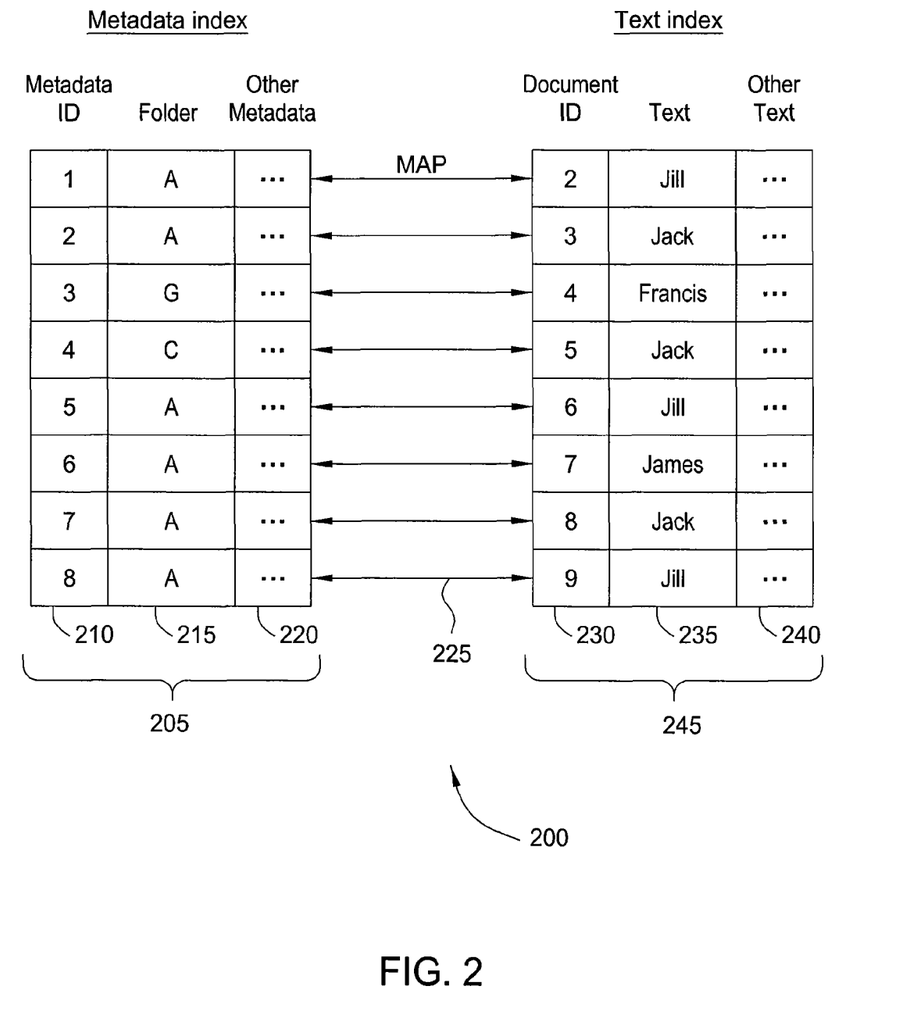
FIG. 2 is a block diagram illustrating a metadata index and a corresponding text index, according to one embodiment of the invention.

FIG. 2 is a block diagram 200 illustrating an example of a metadata index 205 and a corresponding text index 245, according to one embodiment of the invention. As shown, an array may be used for each index. New entries may be added to the end of the each array using a unique identifier (Metadata ID or Document ID). Each row in metadata index 205 contains a unique Metadata ID 210 and a Folder 215 representing where a document is stored. For example, for Metadata ID "2," the Folder is "A." Metadata index 205 may include other metadata 220 as well. For example, other metadata 220 may include a time and date stamp of when a document was created or when the document was recently modified.

Each row in text index 245 contains a unique Document ID 230 as well as Text 235, which contains a first name that is stored in a document. For example, document "3" contains the first name, "Jack." Text index 245 may include any other type of text 240 as well. For example, other text 240 may include last names, addresses, etc. As shown, each entry in metadata index 205 maps to a unique entry in text index 245, and vice-versa. For example, Metadata ID "8" maps (as indicated by an arrow 225) to Document ID "9." Thus, document "9" is located in folder "A." One of ordinary skill in the art will recognize that mapping a Metadata ID to a Document ID may be accomplished in several ways. For example, one mapping method may use a field in metadata index 205 to store a Document ID and a field in text index to store the corresponding Metadata ID 210. For example, the entry for Metadata ID "2" may store Document ID "3" and the entry for Document ID "3" may store Metadata ID "2." Alternatively, another index may be used to map from a document ID to a metadata ID. In such a case, a function call may be implemented which takes an ID, (either a document ID or a metadata ID) and returns the corresponding other ID.

As shown, documents in the text index are stored in the same order as the corresponding metadata entries. By keeping each index ordered (ascending or descending), search engine 107 only needs to make one pass when scanning for documents that match query conditions (see FIGS. 3 and 4). Furthermore, updating a metadata entry does not change a Metadata ID. If the Folder field for Metadata ID "2" is changed from "A" to "B," then Metadata ID "2" will continue to point to Document ID "3." Because document metadata is stored in a separate index than document text, there is no need to reindex a document when metadata changes. Thus, updating metadata (such as a folder name) is fast and takes immediate effect. As a result, search engine 107 results are more accurate.

Figure 3:
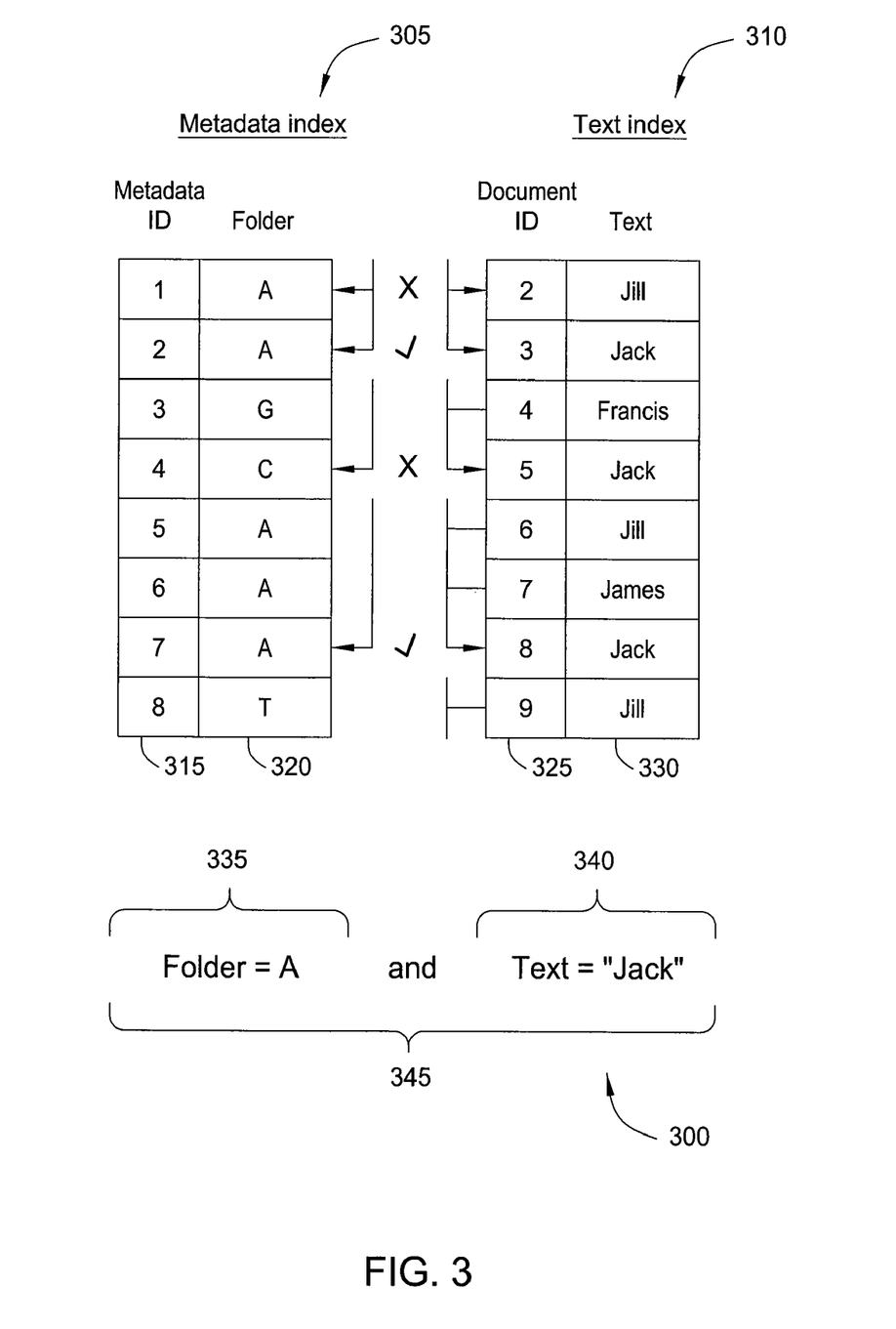
FIG. 3 is a block diagram illustrating a comparison between metadata index and text index for a specific search query, according to one embodiment of the invention.

FIG. 3 is a block diagram 300 illustrating a comparison between metadata index 305 and text index 310 for a specific search query, according to one embodiment of the invention. As in FIG. 2, metadata index 305 contains entries for a metadata ID 315 and a folder 320, while text index 310 contains entries for a document ID 325 and text 330. Search engine 107 begins by decomposing query conditions 345 into a metadata condition 335 and a text condition 340. While scanning metadata index 305 and text index 310, search engine may keep track of its location through the use of pointers or counters or similar programming methods. For example, using the Java® programming language, an iterator object may be used to scan through the text index 310 and the metadata index 305.

In one embodiment, search engine 107 compares the first entry in text index 310 to the text condition 340. In other words, search engine 107 determines if document "2" contains "Jack." Since document "2" does not contain "Jack," the search engine 107 is ready to advance to the next entry in text index 310. Before advancing, search engine 107 determines if another entry exists.

Since document "3" contains "Jack," document "3" matches text condition 340. Search engine 107 then skips to the metadata entry that maps to document "3," which turns out to be the second entry (metadata ID "2"). Search engine 107 then compares folder "A" to metadata condition 335. In other words, search engine 107 determines if document "3" is stored in folder "A." Since the metadata entry matches metadata condition 335 and document "3" matches text condition, search engine 107 stores document "3" as a match.

Search engine 107 then advances to the next entry in text index 310. Since document "4" does not contain "Jack," search engine 107 advances to the next entry in text index 310. Since document "5" contains "Jack," it matches text condition 340. Search engine 107 then skips to the metadata entry that maps to document "5," which turns out to be the entry with metadata ID "4." Search engine 107 then compares folder "C" to metadata condition 335. In other words, search engine 107 determines if document 5 is stored in folder "A." Since the metadata entry does not match metadata condition 335, search engine 107 advances to the next entry in text index 310.

Since documents "6" and "7" do not match "Jack," search engine 107 advances past both entries. Upon determining that document "8" matches "Jack," search engine 107 skips to the metadata entry that maps to document "8," which turns out to be the entry with metadata ID "7." Note that search engine 107 already determined that documents "6" and "7" do not meet text condition 340, so there is no need to spend time evaluating the corresponding metadata ID's ("5" and "6"). Search engine 107 then compares folder "A" to metadata condition 335. In other words, search engine 107 determines if document "8" is stored in folder "A." Since the metadata entry matches metadata condition 335 and document "8" matches text condition 340, search engine 107 stores document "8" as a match.

Search engine 107 then advances to the next entry of text index 310. Upon determining that document "9" does not match "Jack," search engine 107 determines if there is another entry in text index 310. Since there are no more entries, the search is complete and search engine 107 returns search results to query interface 120. In another embodiment, search engine 107 may advance through each entry in metadata index 109 instead of advancing through each entry in text index 110, thereby skipping over some entries in text index 110.

Figure 4:
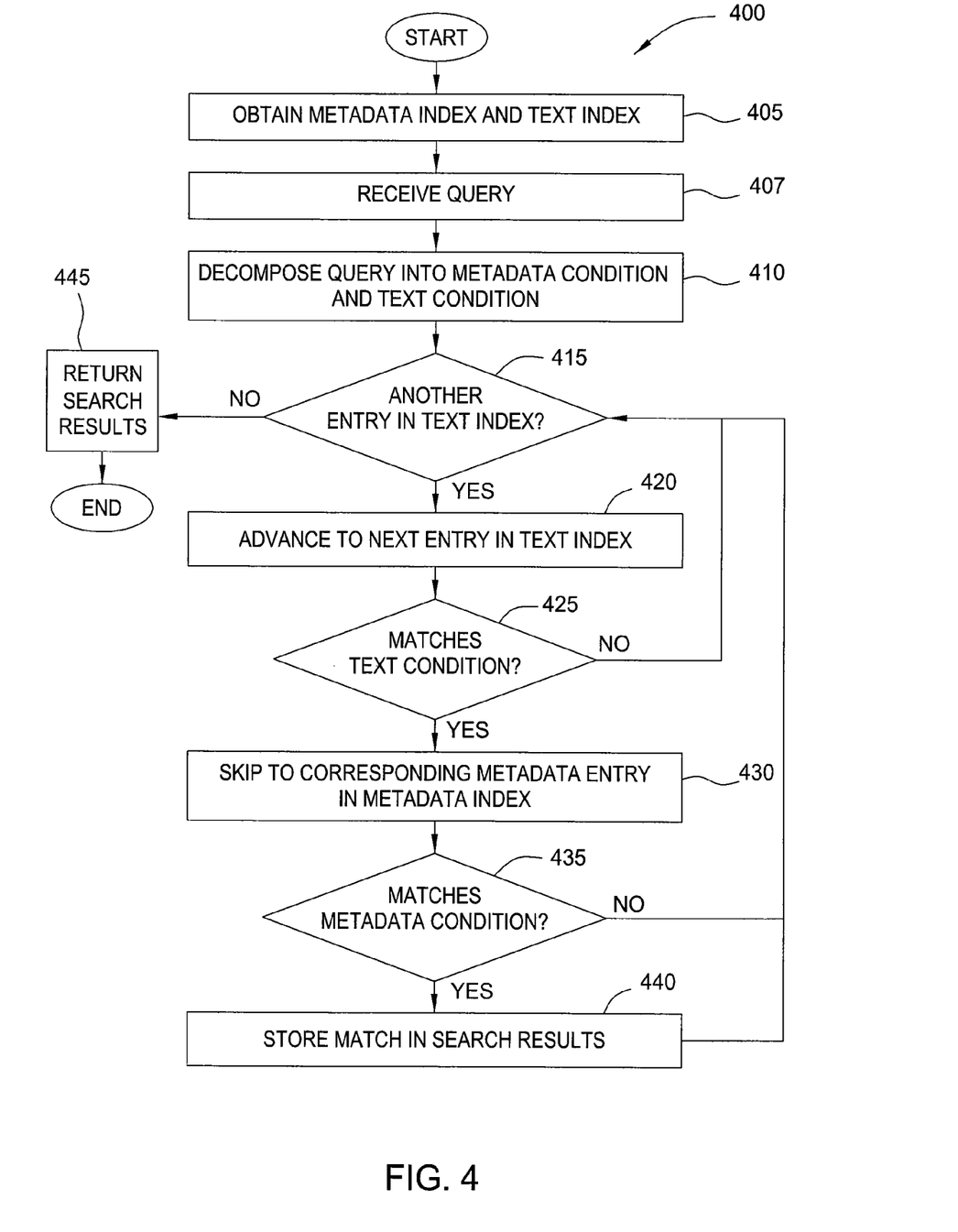
FIG. 4 is a flow diagram illustrating a method for comparing a metadata index to a document index, according to one embodiment of the invention.

FIG. 4 is a flow diagram illustrating a method 400 for comparing metadata index 109 to text index 110, according to one embodiment of the invention. As shown, the method 400 begins at step 405, where search engine 107 obtains a metadata index 109 and a text index 110. At step 407, search engine 107 receives a query from query interface 120. In one embodiment, the query includes at least one condition directed to the metadata index 305 and at least one condition directed to the text index 310. At step 410, the query engine 107 decomposes the query into a metadata condition and a text condition.

At step 415, search engine 107 determines if another entry exists in text index 110. In other words, search engine 107 determines if there is another document ID. If so, then search engine 107 advances to the next entry in text index 110 at step 420. At step 425, search engine 107 compares text condition 340 to the index entry for the current document. If they do not match, then search engine 107 returns to step 415. However, if they do match, search engine 107 skips to the corresponding metadata ID in metadata index 109. The corresponding metadata ID is the metadata ID that maps to the current document ID. At step 435, search engine 107 determines if the metadata in metadata index 109 matches the metadata condition 335. If not, then search engine 107 returns to step 415.

If the metadata in metadata index 109 matches metadata condition 335, then search engine 107 stores the match in search results at step 440. Search engine 107 then returns to step 415 to determine if there are any more entries in text index 110. If not, then search engine returns search results to query interface 120 at step 445. The search results include all documents that match both the text condition 340 and the metadata condition 335.

Figure 5:
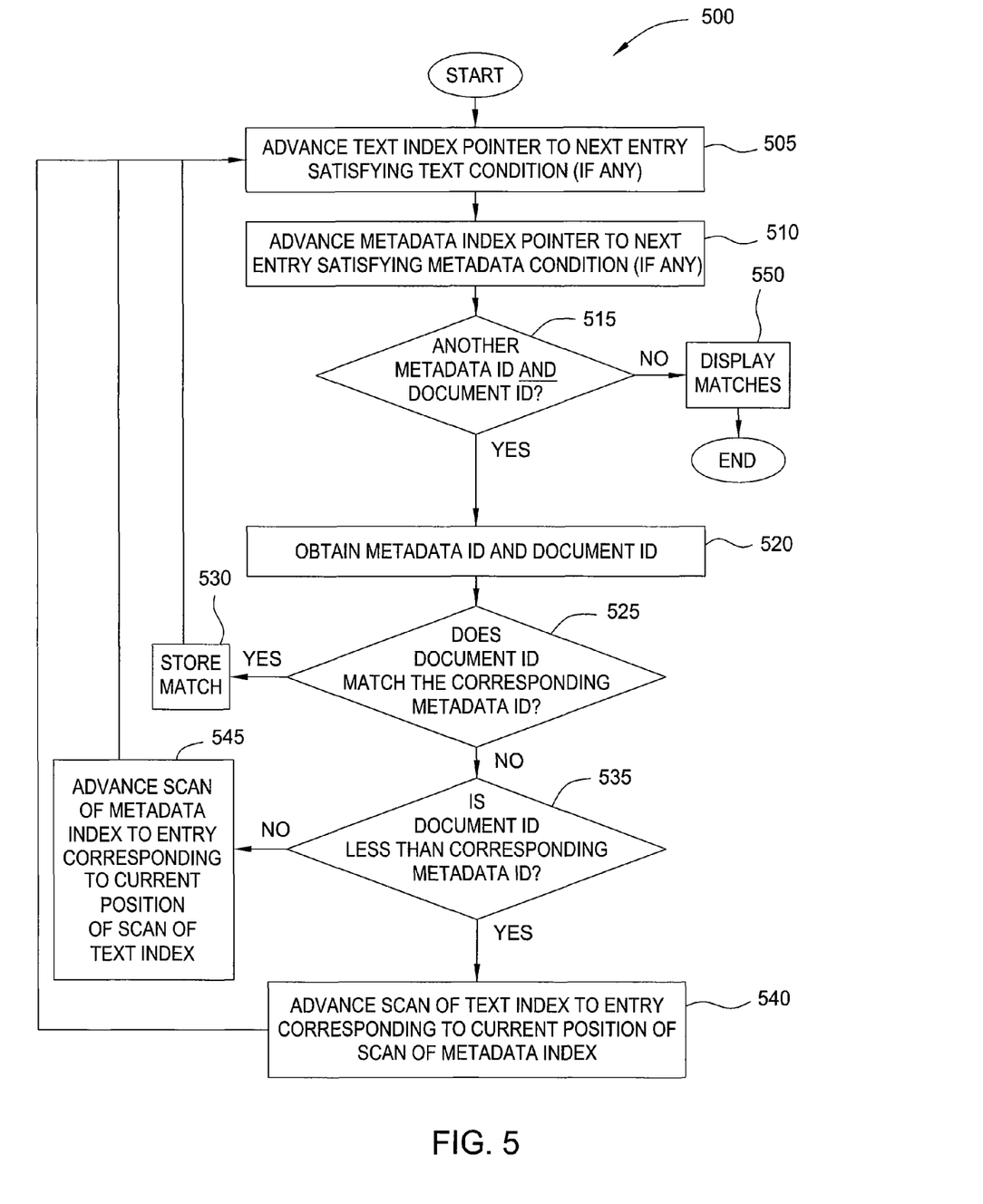
FIG. 5 is a flow diagram illustrating a method 500 for comparing a metadata index to a document index, according to one embodiment of the invention.

FIG. 5 is a flow diagram illustrating a method 500 for scanning a text index and a metadata index to identify entries that satisfy both a metadata condition and a text condition, according to one embodiment of the invention. As shown, the method 500 begins at step 505 where the search engine 107 advances a text index counter to a next entry in the text index that satisfies the text condition (if any). At step 510, the search engine 107 advances a metadata index counter to a next entry in the metadata index that satisfies the metadata condition (if any). At step 515, the search engine determines whether one (or both) counters have advanced fully through the index. That is, whether either of the counter s have reached the end of the corresponding index. Once the end of one of the indexes is reached, at step 550, any results that satisfy both the text condition and the metadata condition are displayed to a user.

Otherwise, at step 520, the search engine 107 determines a current metadata ID and document ID, corresponding to the entry in the text index and metadata index advanced to at steps 505 and 510. At step 525, if the metadata ID and document ID match one another, then that document satisfies both the text condition and the metadata condition and, at step 530, the identifier for the matching document is stored in a temporary set of results. Otherwise, either the pointer to the text index or the pointer to the metadata advanced further through the records. In one embodiment, the pointer that advanced through a fewer number of records is "bumped" to match a position of the pointer that advanced through a greater number of records.

Accordingly, at step 525, if the document ID is less than the corresponding metadata ID, then the scan of the text index is behind the scan of the metadata index. In such a case, at step 540, the pointer being used for the scan of the text index is bumped to match the pointer being used for the scan of the metadata index. For example, in one embodiment, a function may be called that maps a metadata ID to a corresponding text ID. The results of such a function may be used to set the pointer to the text index. Returning to step 525, if the document ID is greater than the corresponding metadata ID, then the scan of the metadata index is behind the scan of the text index. In such a case, at step 545, the pointer being used for the scan of the metadata index is bumped to match the pointer being used for the scan of the text index. The search engine then returns to step 505. This process repeats until, at step 515, the search engine has fully scanned through one of the indexes. Once this occurs, the temporary search results stored at step 530 may be returned as the results of the query.

Table I, below, provides an example pseudo-code implementation of the method 500 using elements of the Java® programming language.

TABLE I

FUNCTION FOR EFFICIENT PARALLEL INDEX SCANNING

```
iterator textIter = new TextIndexIterator( "<text query condition>")
iterator mdIter = new MetadataIndexIterator("<metadata query
condition>")
while (textIter.hasNext( ) && mdIter.hasNext( ) ) {
    textDocId = textItr.getCurrentId( )
    mdDocId = mdIter.getCurrentId( )
    if (MapTtoM( textDocId ) == mdDocId ) {
        // Found a hit, store it somewhere. Document matches both parts of
the query
        textItr.next( );      // Advance to look for future matches
        mdIter.next( );
    } else if ( MapTtoM(textDocId) < mdDocId ) {
        // The text index is behind, so advance it
        newTextId = MapMtoT(mdDocId)
        textItr.skipTo(newTextId);
    } else {
        // The metadata index must be behind, advance it
        newMdId = MapTtoM(textDocId)
        mdItr.skipTo(newMdId);
    }
}
```

In this example, the well known "iterator" object is used to parse through the Text index and the metadata index. Additionally, a "MapTtoM" function is used to map from a text index ID to a metadata index ID. Similarly, a "MapMtoT" function is used from a metadata index ID to a text index ID. Of course, one of ordinary skill in the art will recognize that embodiments of the invention may be implemented in a variety of ways and adapted to suit a variety of different scenarios.

Advantageously, as described above, embodiments of the invention allow efficient updating of metadata and high performance searching through the use of a text index and a separate updateable metadata index. Each unique metadata ID is mapped to a unique document ID in the text index. By storing metadata in a separate updateable metadata index, document metadata can be updated without the need to reindex the entire document. Search results are more accurate because metadata updates are immediately searchable. Moreover, documents in the text index are stored in the same order as metadata entries in the metadata index, which allows the search engine to perform an efficient parallel scan of both indexes. Thus, the invention allows documents stored in a text index to be updated immediately, while preserving all of the other high performance search characteristics of a traditional text index.

What is claimed is:

1. A computer-implemented method for scanning a text index and a metadata index, in parallel, to identify entries that satisfy both a metadata condition and a text condition included in a query, comprising:
    in response to receiving the query, executing a query processing application on a processor, wherein the application is configured to iteratively scan the text index and the metadata index, wherein the scanning comprises:
        advancing a current position in the text index and a current position in the metadata index to a respective next entry in the text index and the metadata index which references a respective document that satisfies the respective text condition and metadata condition,
        upon determining that the current position in the text index and the current position in the metadata index each advanced to a position referencing the same document, adding that document to a set of query results for the query, and
        upon determining that the respective current positions in the text index and the metadata index are different relative to one another, advancing the current position of one of the text index and the metadata index to the current position of the other index.

2. The computer-implemented method of claim 1, wherein the text index stores a plurality of entries, and wherein each entry of the text index includes:
    a document ID corresponding to a document stored on a file system, and one or more text fields storing a list of one more terms present in the document; and wherein the metadata index stores a plurality of entries, and wherein each entry in the metadata index includes:
    a metadata ID corresponding to a document, and
    one or more metadata fields storing metadata associated with the document.

3. The computer-implemented method of claim 2, wherein at least one metadata field stores a path name representing a location in a file system where the document is stored.

4. The computer-implemented method of claim 1, wherein a mapping function is used to map from a document ID referencing a document in the text index to a metadata ID corresponding to the same document in the metadata index.

5. The computer-implemented method of claim 1, wherein the text index and the metadata index are stored as arrays.

6. The computer-implemented method of claim 1, wherein the text index and the metadata index are scanned using an iterator object.

7. The computer-implemented method of claim 1, wherein the text condition includes one or more search terms, wherein each search term specifies a word that should be in a document in order for that document to be included in the set of query results.

8. The computer-implemented method of claim 1, wherein the text index and the metadata index are sorted according to a common ordering.

9. A computer readable storage medium containing a program which, when executed, performs an operation for scanning a text index and a metadata index, in parallel, to identify entries that satisfy both a metadata condition and a text condition included in a query, the operation comprising:

in response to receiving the query, iteratively scanning the text index and the metadata index, wherein the scanning comprises:

advancing a current position in the text index and a current position in the metadata index to a respective next entry in the text index and the metadata index which references a respective document that satisfies the respective text condition and metadata condition,         upon determining that the current position in the text index and the current position in the metadata index each advanced to a position referencing the same document, adding that document to a set of query results for the query, and         upon determining that the respective current positions in the text index and the metadata index are different relative to one another, advancing the current position of one of the text index and the metadata index to the current position of the other index.

10. The computer readable storage medium of claim 9, wherein the text index stores a plurality of entries, and wherein each entry of the text index includes:

a document ID corresponding to a document stored on a file system, and one or more text fields storing a list of one more terms present in the document; and     wherein the metadata index stores a plurality of entries, and wherein each entry in the metadata index includes:

a metadata ID corresponding to a document, and         one or more metadata fields storing metadata associated with the document.

11. The computer readable storage medium of claim 10, wherein at least one metadata field stores a path name representing a location in a file system where the document is stored.

12. The computer readable storage medium of claim 9, wherein a mapping function is used to map from a document ID referencing a document in the text index to a metadata ID corresponding to the same document in the metadata index.

13. The computer readable storage medium of claim 9, wherein the text index and the metadata index are stored as arrays.

14. The computer readable storage medium of claim 9, wherein the text index and the metadata index are scanned using an iterator object.

15. The computer readable storage medium of claim 9, wherein the text condition includes one or more search terms, wherein each search term specifies a word that should be in a document in order for that document to be included in the set of query results.

16. The computer readable storage medium of claim 9, wherein the text index and the metadata index are sorted according to a common ordering.

17. A system, comprising:

a processor; and a memory containing a program, which, when executed by the processor is configured to perform an operation for scanning a text index and a metadata index, in parallel, to identify entries that satisfy both a metadata condition and a text condition included in a query, the operation comprising:

in response to receiving the query, iteratively scanning the text index and the metadata index, wherein the scanning comprises:

advancing a current position in the text index and a current position in the metadata index to a respective next entry in the text index and the metadata index which references a respective document that satisfies the respective text condition and metadata condition,         upon determining that the current position in the text index and the current position in the metadata index each advanced to a position referencing the same document, adding that document to a set of query results for the query, and         upon determining that the respective current positions in the text index and the metadata index are different relative to one another, advancing the current position of one of the text index and the metadata index to the current position of the other index.

18. The system of claim 17, wherein the text index stores a plurality of entries, and wherein each entry of the text index includes:

a document ID corresponding to a document stored on a file system, and one or more text fields storing a list of one more terms present in the document; and     wherein the metadata index stores a plurality of entries, and wherein each entry in the metadata index includes:

a metadata ID corresponding to a document, and         one or more metadata fields storing metadata associated with the document.

19. The system of claim 18, wherein at least one metadata field stores a path name representing a location in a file system where the document is stored.

20. The system of claim 17, wherein a mapping function is used to map from a document ID referencing a document in the text index to a metadata ID corresponding to the same document in the metadata index.

21. The system of claim 17, wherein the text index and the metadata index are stored as arrays.

22. The system of claim 17, wherein the text index and the metadata index are scanned using an iterator object.

23. The system of claim 17, wherein the text condition includes one or more search terms, wherein each search term specifies a word that should be in a document in order for that document to be included in the set of query results.

24. The system of claim 17, wherein the text index and the metadata index are sorted according to a common ordering.

* * * * *